(12) United States Patent
Iwayama

(10) Patent No.: US 6,556,883 B2
(45) Date of Patent: Apr. 29, 2003

(54) PERFORMANCE VALUE DETERMINATION SYSTEM AND METHOD

(75) Inventor: Naomi Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 09/785,206

(22) Filed: Feb. 20, 2001

(65) Prior Publication Data

US 2002/0046190 A1 Apr. 18, 2002

(30) Foreign Application Priority Data

Oct. 18, 2000 (JP) ........................ 2000-317730

(51) Int. Cl.[7] ................ G06F 19/00; G06F 11/30; G06F 15/00; G06F 17/00; G21C 17/00
(52) U.S. Cl. .............. 700/108; 705/400; 702/81; 702/182
(58) Field of Search ............... 700/108, 109, 700/110; 702/81–84, 182; 705/400

(56) References Cited

U.S. PATENT DOCUMENTS

| | | | | |
|---|---|---|---|---|
| 5,960,407 A | * | 9/1999 | Vivona ................. | 705/10 |
| 6,259,960 B1 | * | 7/2001 | Inokuchi ............... | 700/110 |
| 6,304,853 B1 | * | 10/2001 | Malnekoff .............. | 705/27 |
| 2002/0161664 A1 | * | 10/2002 | Shaya et al. .......... | 705/26 |

FOREIGN PATENT DOCUMENTS

JP      11-39564      2/1999

OTHER PUBLICATIONS

Business & Technology, Sep. 4, 2000 (with translation).

* cited by examiner

Primary Examiner—Leo Picard
Assistant Examiner—Ryan Jarrett
(74) Attorney, Agent, or Firm—Staas & Halsey LLP

(57) ABSTRACT

A performance value determination system with respect to goods having an index for objectively evaluating performance thereof includes: a performance value determination condition input and storing part for inputting and storing a time condition for determining a performance value; a performance measuring part for measuring performance of the goods during use as performance data; a performance data storing part for storing the performance data; a performance value determination-timing judging part for judging whether or not the time condition for determining a performance value is satisfied; and a performance value determining part for, in a case where it is judged that the time condition for determining a performance value is satisfied, determining a value of the goods based on the performance data stored in the performance data storing part by a time determined by the time condition.

10 Claims, 8 Drawing Sheets

PERFORMANCE VALUE DETERMINATION SYSTEM AND METHOD

BACKGROUND OF THE INVENTION

1. Field of the Invention

The present invention relates to a performance value determination system and method with respect to goods whose performance can be objectively measured.

2. Description of the Related Art

Some goods can be objectively evaluated for performance. For example, an incorrect conversion rate in a word processor, a misrecognition rate in a pattern recognition system such as a character recognition system and a voice recognition system, and the like may be a standard for objective evaluation of performance.

In general, consumers are motivated to purchase goods which they have determined to have performance satisfying their desires, in accordance with the performance of the goods. However, the performance of the goods can be determined only based on general indexes and the like shown in catalogs. Thus, the consumers have no choice but to purchase the goods irrespective of whether the performance desired by the consumers can be exhibited during actual use.

In order to prevent such disadvantages, for example, JP11(1999)-39564 discloses a method for varying a use fee of attraction in amusement facilities, based on the satisfaction of users at a time of using attraction.

However, according to the method disclosed in JP11 (1999)-39564, a use fee is determined in accordance with the satisfaction with respect to goods themselves, which will not necessarily reflect the performance of goods. More specifically, even in the case where goods exhibit equivalent performance, the satisfaction of a user may be varied in accordance with a use condition of the goods.

For example, the following is considered in an amusement facility: as a user often visits the facility, user's feeling of freshness is vanishing, and accordingly, the reaction of a living body corresponding to the satisfaction is also becoming slow. In this case, although the performance of goods has not changed at all, a use fee of the facility is decreased. The reason for this is that the above-mentioned method is targeted for goods that are to be used temporarily, and cannot set a fee of goods, of which performance can be correctly evaluated by continuous use, based on their performance.

Furthermore, in a research and development stage, whether or not goods can exhibit their performance is verified by an experiment and the like in various aspects. However, regarding whether or not the goods exhibit their designed performance during actual use of a purchaser, sufficient live data is not obtained. Therefore, it is difficult to correctly determine whether or not the goods exhibit their performance during actual use, and it is also difficult to provide feedback to the development of next generation goods.

SUMMARY OF THE INVENTION

Therefore, with the foregoing in mind, it is an object of the present invention to provide a performance value determination system and method capable of determining a reasonable value of even some goods that are to be used continuously, in accordance with their performance, and collecting live data during actual use.

In order to achieve the above-mentioned object, the performance value determination system of the present invention, with respect to goods having an index for objectively evaluating performance thereof, includes: a performance value determination condition input and storing part for inputting and storing a time condition for determining a performance value; a performance measuring part for measuring performance of the goods during use as performance data; a performance data storing part for storing the performance data; a performance value determination-timing judging part for judging whether or not the time condition for determining a performance value is satisfied; and a performance value determining part for, in a case where it is judged that the time condition for determining a performance value is satisfied, determining a value of the goods based on the performance data stored in the performance data storing part by a time determined by the time condition.

Because of the above-mentioned constitution, even some goods that are to be continuously used, as well as those which are to be temporarily used can be determined for a reasonable value in accordance with their performance. Accordingly, a price of goods can be set in accordance with a value to a user.

Furthermore, it is preferable that the performance value determination system of the present invention further includes a use period of time measuring part for accumulating a period of time during which the goods have been used, wherein the time condition for determining a performance value is that a total use period of time of the goods exceeds a predetermined period of time. The reason for this is that if the goods have not been used at least for a predetermined period of time, it is difficult to grasp average performance of the goods.

Furthermore, it is preferable that the performance value determination system of the present invention further includes a use number of times measuring part for measuring a number of times the goods have been used, wherein the time condition for determining a performance value is that a total use number of times of the goods exceeds a predetermined number of times. Similarly, the reason for this is that if the goods have not been used at least a predetermined number of times, it is difficult to grasp average performance of the goods.

Furthermore, it is preferable that the performance value determination system of the present invention further includes a performance data effectiveness determining part for determining whether or not the performance data is effective, wherein, in a case where it is judged that the time condition for determining a performance value is satisfied, effectiveness of the performance data stored in the performance data storing part is determined. The reason for this is that if effectiveness is determined based on ineffective performance data, a reasonable value cannot be determined.

Furthermore, it is preferable that the performance value determination system of the present invention further includes an input data storing part for storing input data inputted for exhibiting a function of the goods, wherein, in a case where it is judged that the time condition for determining a performance value is satisfied, the input data is passed to a provider of the goods. The reason for this is that since data directly useful for improving and enhancing a function of the goods can be collected, more efficient development of the goods can be promoted by utilizing such data for development of next generation goods.

Furthermore, it is preferable that, in the input data storing part, only the input data in a case where a predetermined function of the goods cannot be exhibited is stored. The reason for this is that only data directly useful for improving and enhancing a function of the goods can be collected, and an absolute amount of input data to be stored can be reduced.

Furthermore, the present invention is characterized by software for executing, as processing steps, the above-mentioned performance value determination system. More specifically, the present invention is characterized by a method for determining a performance value with respect to goods having an index for objectively evaluating performance thereof, including inputting and storing a time condition for determining a performance value; measuring performance of the goods during use as performance data; storing the performance data; judging whether or not the time condition for determining a performance value is satisfied; and in a case where it is judged that the time condition for determining a performance value is satisfied, determining a value of the goods based on the stored performance data by a time determined by the time condition, and a computer-readable recording medium storing these operations as a program.

Because of the above-mentioned constitution, by loading the program onto a computer for execution, a performance value determination system can be configured in which even some goods that are to be continuously used, as well as those which are to be temporarily used can be determined for a reasonable value in accordance with their performance, and a price of goods can be set in accordance with a value to a user.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Figure 1:
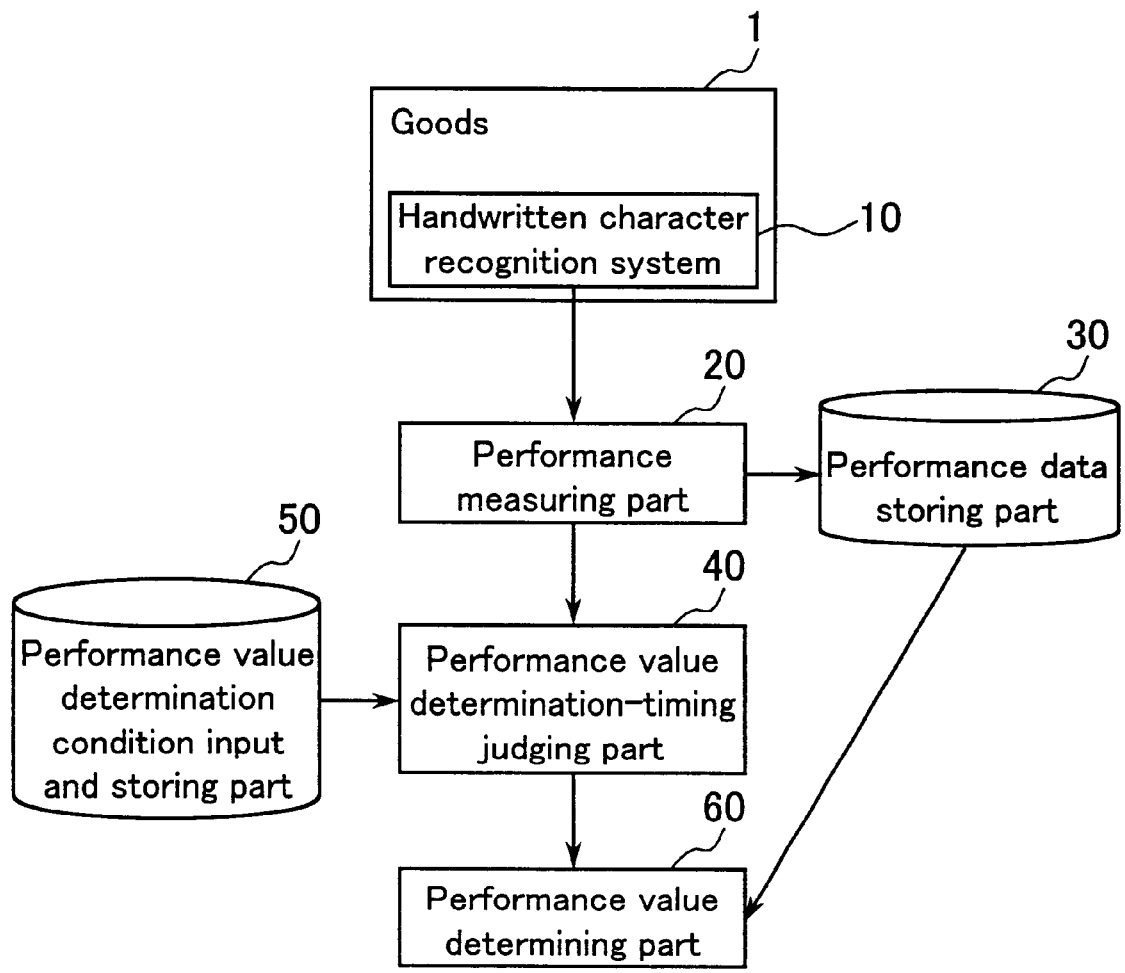
FIG. 1 is a block diagram of a performance value determination system of Embodiment 1 according to the present invention.

Hereinafter, a performance value determination system of Embodiment 1 according to the present invention will be described with reference to the drawings. In Embodiment 1, goods equipped with an online handwritten character recognition system will be exemplified. FIG. 1 is a block diagram of the performance value determination system of Embodiment 1 according to the present invention.

In FIG. 1, reference numeral 1 denotes goods equipped with a handwritten character recognition system 10, and performance data during actual use is stored in a performance data storing part 30 by a performance measuring part 20 for measuring the performance of the handwritten character recognition system 10.

The online handwritten character recognition system of Embodiment 1 displays recognition results with respect to a handwritten character pattern input by a user. In the case where recognition results are incorrect, the user conducts a correction operation by inputting a handwritten character pattern again, selecting another candidate character, or the like.

Thus, by counting the number of input characters and the number of characters subjected to a correction operation, a misrecognition rate (i.e., a ratio of the number of misrecognized characters to the number of input characters) can be measured. These data are stored in the performance data storing part 30 as performance data of the online handwritten character recognition system.

Furthermore, a performance value determination condition is stored in a performance value determination condition input and storing part 50 before obtaining performance data, and a performance value determination-timing judging part 40 judges whether or not a time condition for determining a performance value is satisfied.

As the performance value determination condition, time conditions such as the elapse of three months after commencement of use and the accumulation of the number of input characters exceeding a predetermined threshold value are considered. The performance value determination-timing judging part 40 judges whether or not three months have passed since the goods 1 started being used, or whether or not the accumulation of the number of input characters exceeds a predetermined threshold value.

Figure 2:
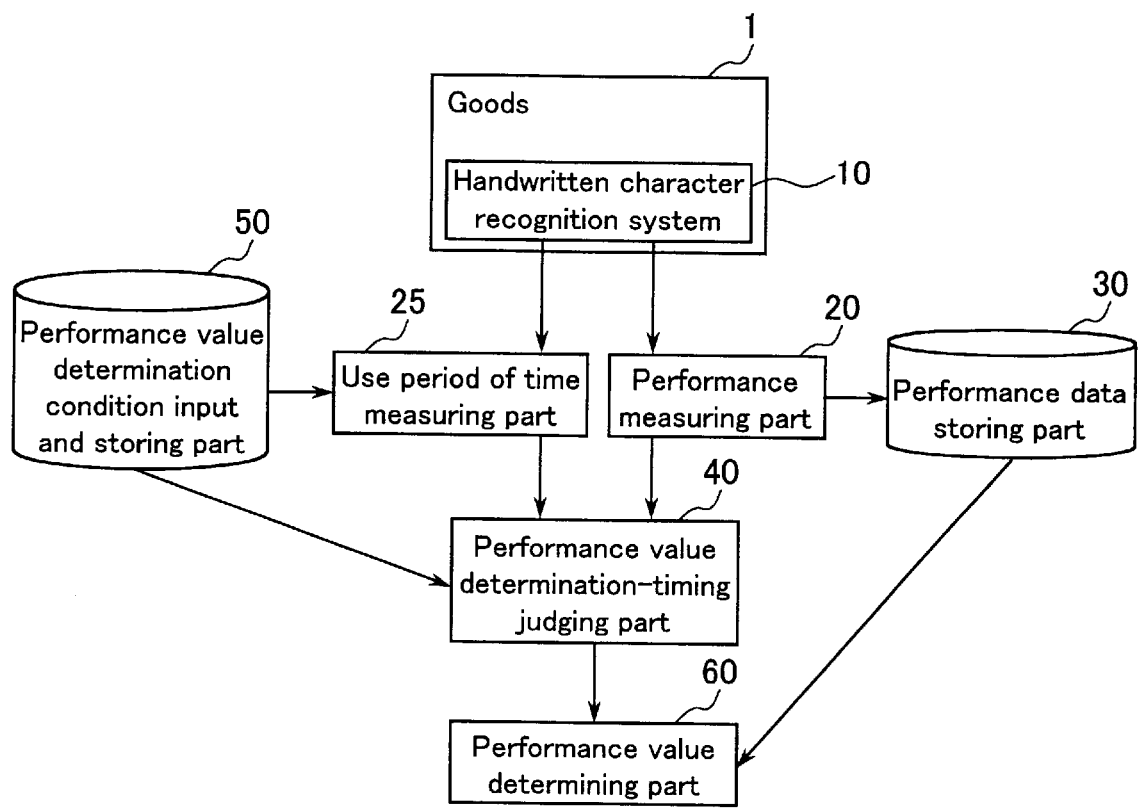
FIG. 2 is a block diagram of a performance value determination system of Embodiment 1 according to the present invention.

In the case of adopting the time condition of "the elapse of three months after commencement of use" as the performance value determination condition, as shown in FIG. 2, a use period of time measuring part 25 measures a use period of time, and the performance value determination-timing judging part 40 monitors whether or not the time condition of "the elapse of three months after commencement of use" stored in the performance value determination condition input and storing part 50 is satisfied.

Figure 3:
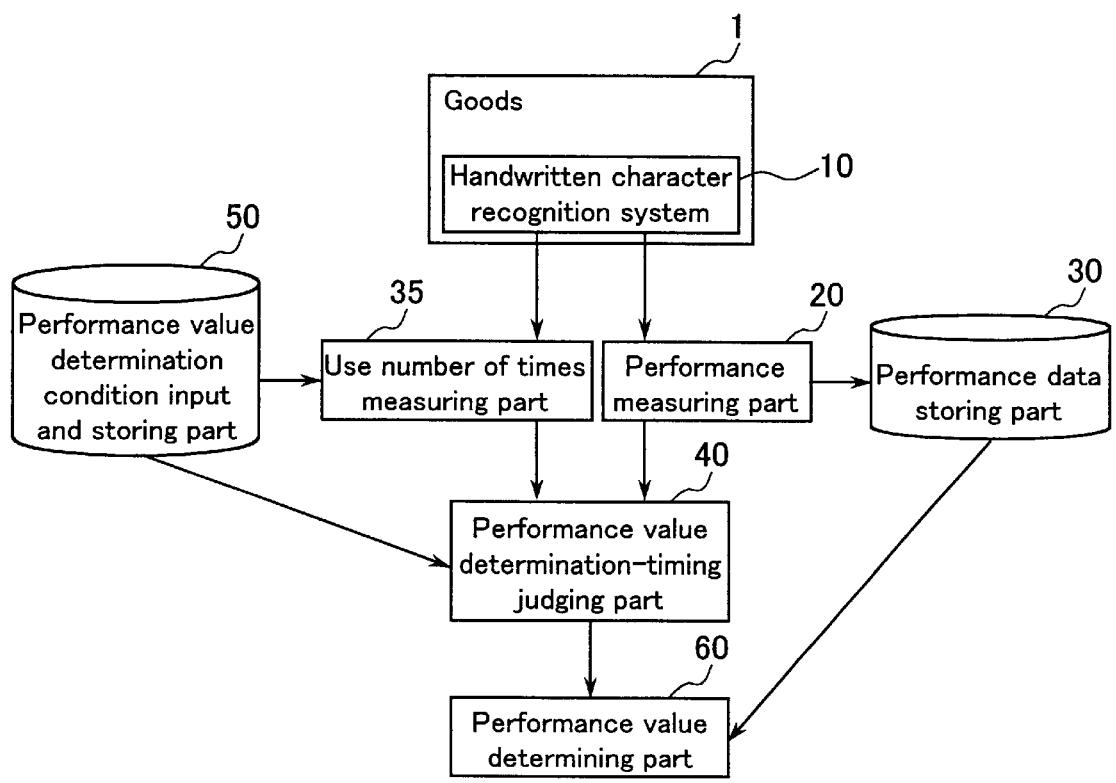
FIG. 3 is a block diagram of a performance value determination system of Embodiment 1 according to the present invention.

Furthermore, in the case of adopting the time condition of "the accumulation of the number of input characters exceeding a predetermined threshold value" as the performance value determination condition, as shown in FIG. 3, a use number of times measuring part 35 measures a use number of times, and the performance value determination-timing judging part 40 monitors whether or not the time condition of "the accumulation number of input characters exceeding a predetermined threshold value" stored in the performance value determination condition input and storing part 50 is satisfied.

In the case where the performance value determination-timing judging part 40 judges that the time condition as described above is satisfied, a performance value determining part 60 studies whether or not the originally designed performance is exhibited on the market, based on the performance data stored in the performance data storing part 30, and determines a performance value of the goods 1 in accordance with the degree of performance.

For example, assuming that a value in the case of a recognition rate of 100% is determined by the sum of a fixed fee P1 and a variable fee P2, a performance value P can be represented by the following Formula 1:

$$P = P1 + P2 \times (1 - P_E) \qquad (1)$$

where $P_E$ is a misrecognition rate.

It should be noted that there is no particular limit to a method for paying a performance value determined by Formula 1. More specifically, it may be possible that a highest fee (P1+P2) is paid as a value at a time of purchase of the goods 1, and a difference between the highest fee and the performance value determined at a time of determination of a performance value is refunded. Alternatively, it may be possible that only a paying method is determined, and a performance value determined at a time of determination of a performance value is paid.

It is required to use the performance measuring part 20 simultaneously with the goods 1; however, the other components are not necessarily required to be used in the vicinity of the goods 1. More specifically, the performance data storing part 30 may be configured on a server placed on the network. This also applies to the performance value determination condition input and storing part 50. Furthermore, the performance value determination-timing judging part 40 is configured on a server placed on the network so that a judgement is made on the server, and only the results are transmitted. This also applies to the performance value determining part 60. Furthermore, it may be possible that when a performance value determination condition is satisfied, this fact is displayed to a user, and a performance value is determined at a time of connection to the server.

The following may also be considered: when the performance value determination-timing judging part 40 judges that a time for determining a performance value has come, the effectiveness of performance data is confirmed. This is because it becomes difficult to make a reasonable judgement in the case where performance data and the like under special conditions are contained.

Figure 4:
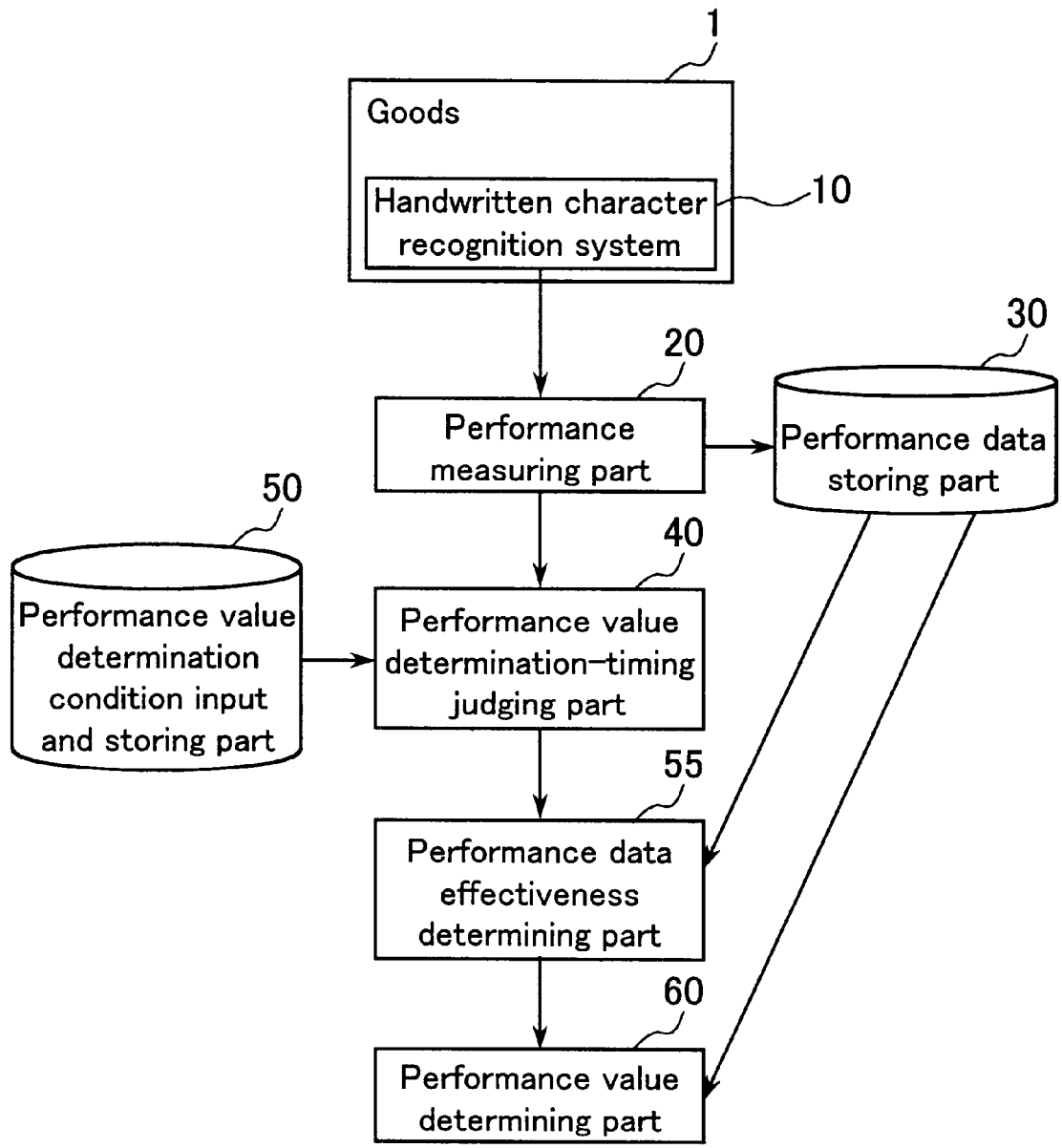
FIG. 4 is a block diagram of a performance value determination system of Embodiment 1 according to the present invention.

Thus, as shown in FIG. 4, a performance data effectiveness determining part 55 is provided so as to determine whether or not performance data stored in the performance data storing part 30 is effective. More specifically, in the case where the performance value determination condition is "the elapse of three months after commencement of use", when a use frequency of a handwritten character recognition system is extremely low, the reliability of the performance data is considered to be low even if three months have passed.

Therefore, by providing a predetermined standard with respect to a use number of times of the handwritten character recognition system (e.g., a determination standard such as determining that only performance data used at least 1000 times is effective), average performance data can be obtained.

Figure 5:
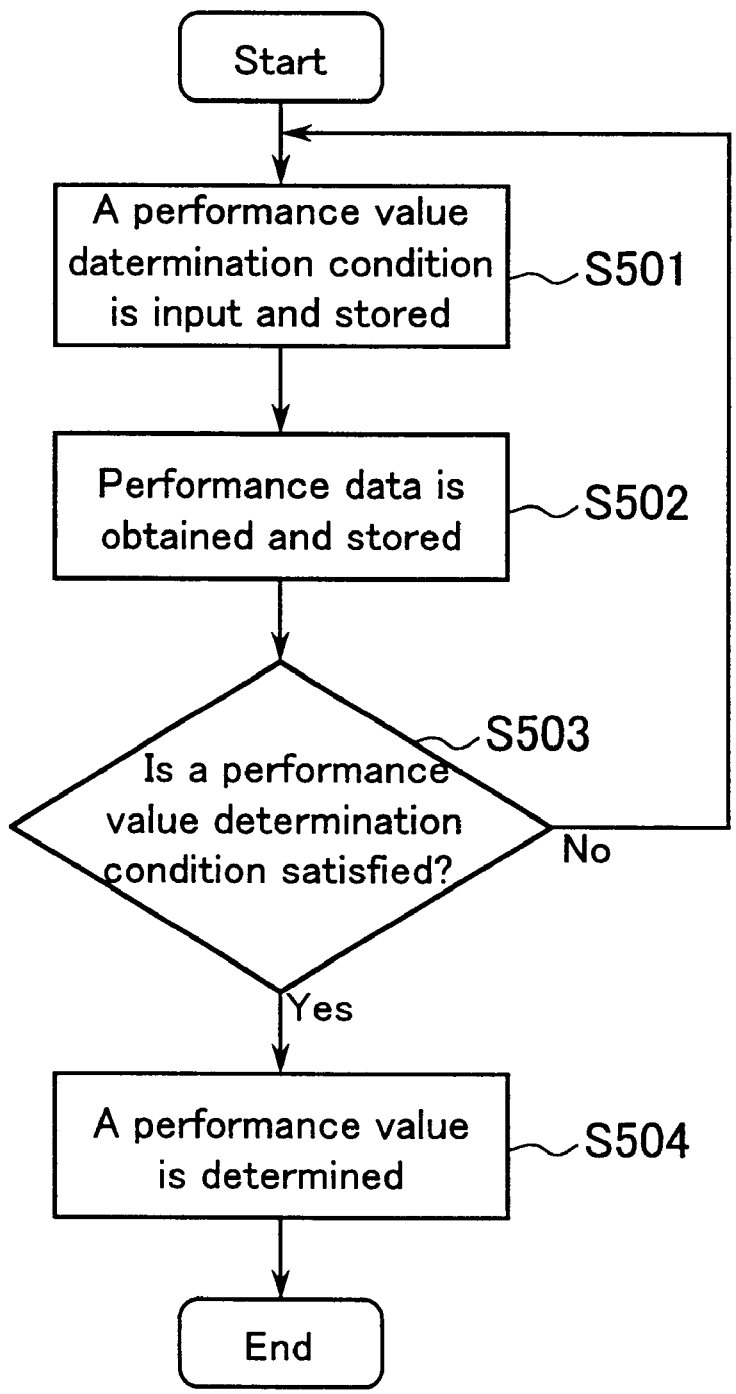
FIG. 5 is a flow chart illustrating processing in the performance value determination system of Embodiment 1 according to the present invention.

Next, a processing flow of a program for realizing the performance value determination system of Embodiment 1 according to the present invention will be described. FIG. 5 shows a flow chart illustrating processing of a program for realizing the performance value determination system of Embodiment 1 according to the present invention.

In FIG. 5, a performance value determination condition is input (Operation 501). It is also considered that the performance value determination condition has already been stored in a performance value determination system. In this case, the input processing is not required. As the performance value determination condition, a use period of time, a use number of times, and the like with respect to a target system for evaluating performance are desired.

Then, in use of the target system for evaluating performance, performance data to be a basis for evaluating performance is obtained based on input data and result data thereof and stored (Operation 502).

It is judged whether or not the performance value determination condition is satisfied (Operation 503). In the case where the performance value determination condition is satisfied (Operation 503: Yes), a performance value is determined based on the performance data at that time (Operation 504). In the case where the performance value determination condition is not satisfied (Operation 503: No), the target system for evaluating performance continues to be used until the performance value determination condition is satisfied.

As described above, in Embodiment 1, even some goods that are to be continuously used, as well as those which are to be temporarily used can be determined for a reasonable value in accordance with their performance. Accordingly, a price of goods can be set in accordance with a value to a user.

Embodiment 2

Hereinafter, a performance value determination system of Embodiment 2 according to the present invention will be described with reference to the drawings. The performance value determination system of Embodiment 2 has substantially the same configuration as that of Embodiment 1, expect that the object of Embodiment 2 lies in collection of performance data during actual use on the market.

Figure 6:
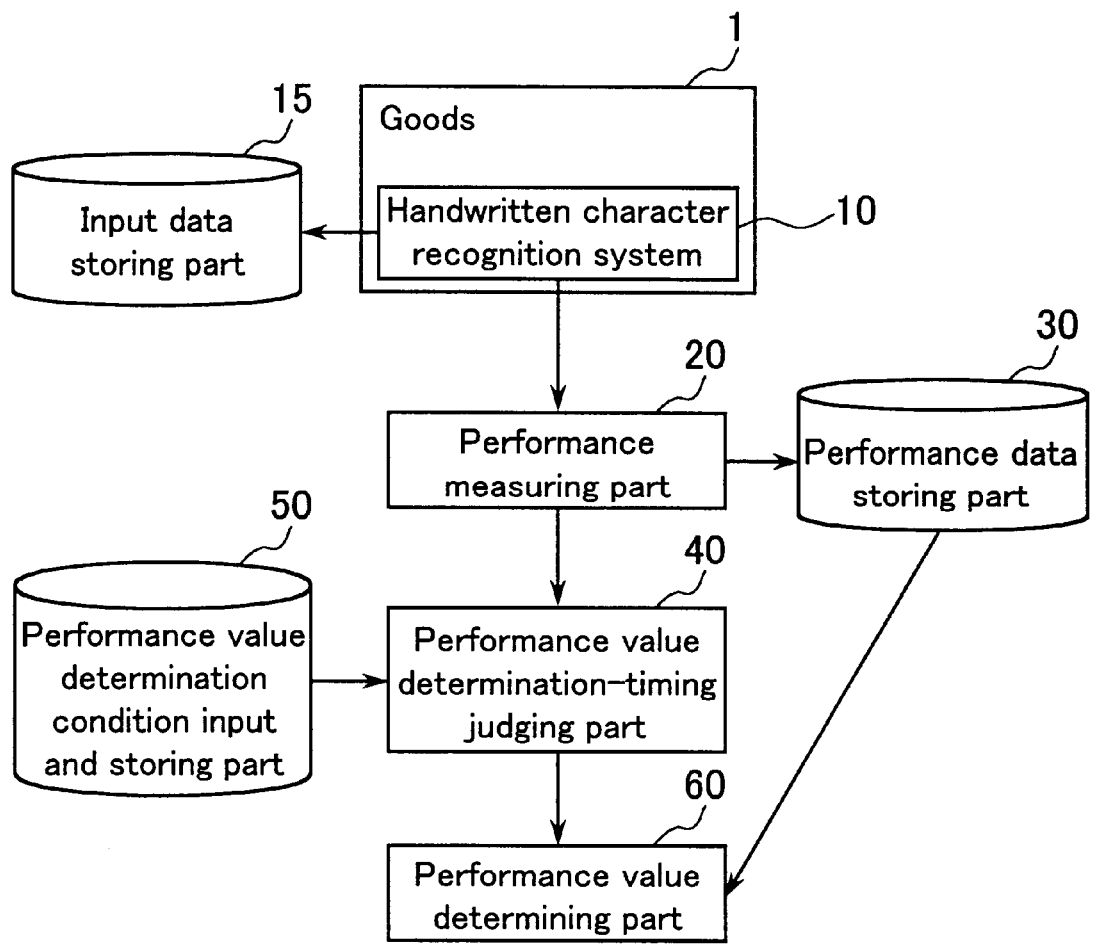
FIG. 6 is a block diagram of a performance value determination system of Embodiment 2 according to the present invention.

FIG. 6 is a block diagram of a performance value determination system of Embodiment 2 according to the present invention. FIG. 6 is different from FIG. 1 in that an input data storing part 15 is provided for storing input handwritten character data when a handwritten character is input from the handwritten character recognition system 10.

Data stored in the input data storing part 15 is live data to be a target for measuring performance in the performance measuring part 20. Therefore, by conducting payback or the like in exchange for collection of data, data actually used on the market can be collected.

All the live data may be stored. Alternatively, only failure data subjected to misrecognition may be collected. More specifically, only misrecognized input data in the handwritten character recognition system 10 is stored in the input data storing part 15, whereby only input data that cannot be correctly recognized in the handwritten character recognition system can be collected, and the cause of misrecognition can be accurately grasped. Furthermore, the capacity of a recording medium for recording input data may be small, resulting in an effective reduction of a computer resource.

Figure 7:
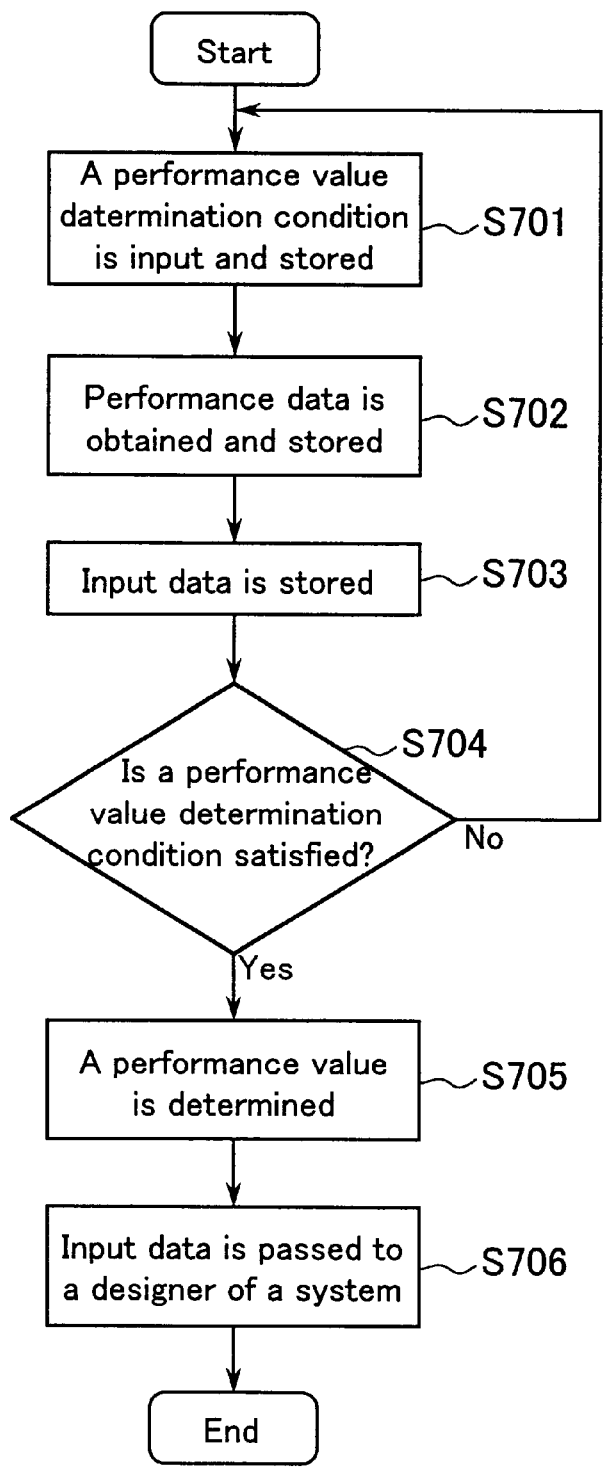
FIG. 7 is a flow chart illustrating processing in the performance value determination system of Embodiment 2 according to the present invention.

Next, a processing flow of a program for realizing the performance value determination system of Embodiment 2 according to the present invention will be described. FIG. 7 is a flow chart illustrating processing of a program for realizing the performance value determination system of Embodiment 2 according to the present invention.

In FIG. 7, a performance value determination condition is input (Operation 701). As the performance value determination condition, time conditions such as a use period of time with respect to a target system for evaluating performance are desired.

Then, in use of the target system for evaluating performance, performance data to be a basis for evaluating performance is successively obtained based on input data and result data thereof and stored (Operation 702). Simultaneously, input data is also stored (Operation 703).

It is judged whether or not the performance value determination condition is satisfied (Operation 704). In the case where the performance value determination condition is satisfied (Operation 704: Yes), a performance value is determined based on the performance data at that time (Operation 705). In the case where the performance value determination condition is not satisfied (Operation 704: No), the target system for evaluating performance continues to be used until the performance value determination condition is satisfied.

The stored input data is passed to a designer of the target system for evaluating performance at a time of paying a value or reimbursement (Operation 706). As a method for passing the stored input data to the designer of the system, it is considered that, for example in the case where a performance value determining part is placed on a server, when a performance value determination condition is satisfied, the server determines a value, and simultaneously, input data is transmitted to the server by a communication function of the goods. It is not required to use a communication line. For example, input data is recorded on a portable recording medium such as a floppy disk, which is manually passed to the designer later.

As described above, in Embodiment 2, data directly useful for improving and enhancing the function of the goods can be collected, and utilized for development of next generation goods.

Figure 8:
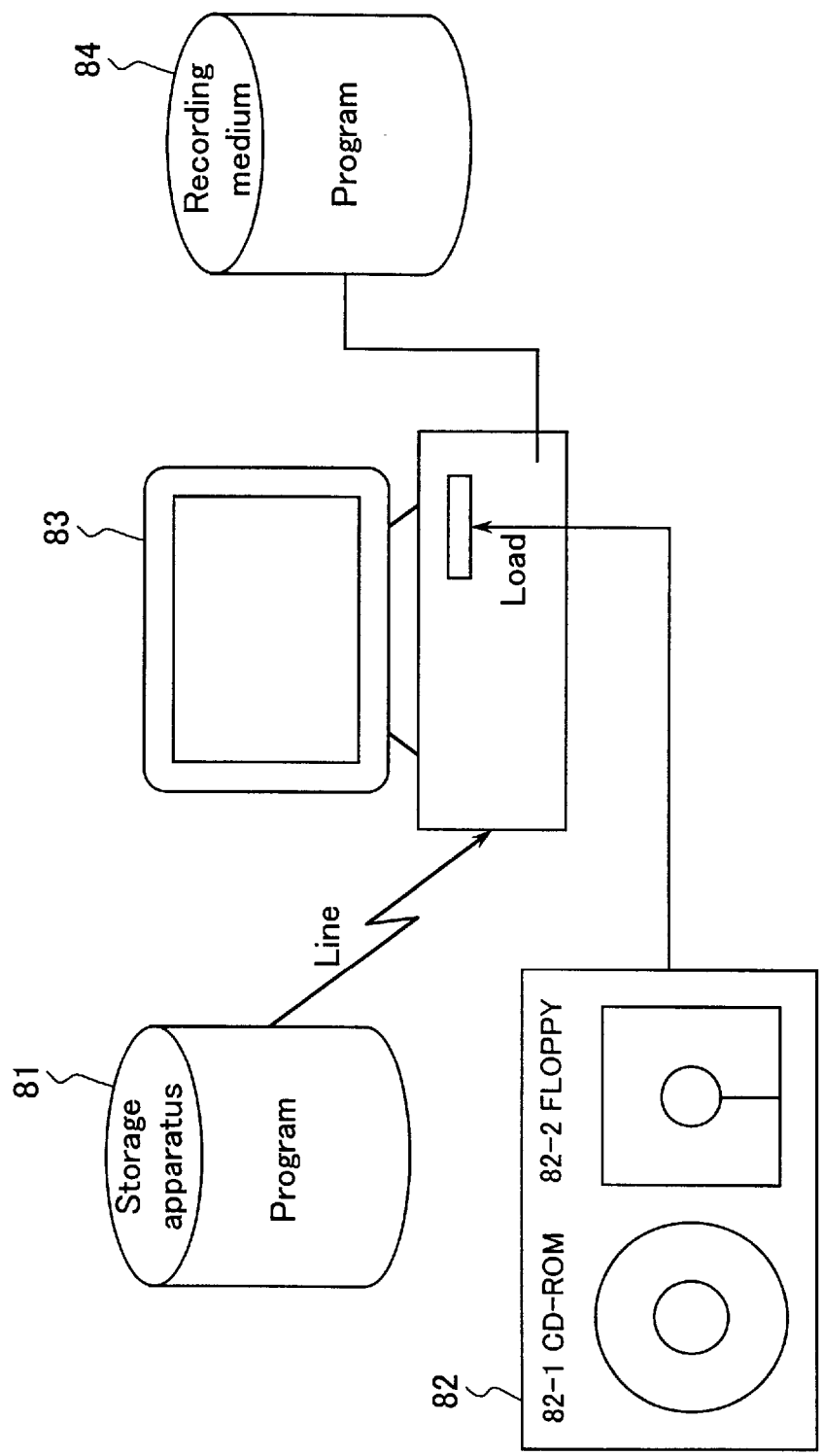
FIG. 8 shows exemplary recording media.

Examples of the recording medium storing a program for realizing the performance value determination system of the embodiments according to the present invention include a storage apparatus 81 provided at the end of a communication line, and a recording medium 84 such as a hard disk and a RAM of a computer 83, as well as a portable recording medium 82 such as a CD-ROM 82-1 and a floppy disk 82-2, as shown in FIG. 8. In execution, the program is loaded onto a computer, and executed on a main memory.

Furthermore, examples of the recording medium storing performance data and the like generated by the performance value determination system of the embodiments according to the present invention include a storage apparatus provided at the end of a communication line, and a recording medium 84 such as a hard disk and a RAM of a computer 83, as well as a portable recording medium 82 such as a CD-ROM 82-1 and a floppy disk 82-2, as shown in FIG. 8. For example, when the performance value determination system of the present invention is utilized, such a recording medium is read by the computer 83.

As described above, in the performance value determination system of the present invention, even some goods that are to be continuously used, as well as those which are to be temporarily used can be determined for a reasonable value in accordance with their performance. Accordingly, a price of goods can be set in accordance with a value to a user.

Furthermore, in the performance value determination system of the present invention, data directly useful for improving and enhancing the function of the goods can be collected, and utilized for development of next generation goods.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A performance value determination system with respect to goods having an index for objectively evaluating performance thereof, comprising:

a performance value determination condition input and storing part for inputting and storing a time condition for determining a performance value;

a performance measuring part for measuring performance of the goods during use as performance data;

a performance data storing part for storing the performance data;

a performance value determination-timing judging part for judging whether or not the time condition for determining a performance value is satisfied; and a performance value determining part for, in a case where it is judged that the time condition for determining a performance value is satisfied, determining a value of the goods based on the performance data stored in the performance data storing part by a time determined by the time condition.

2. A performance value determination system according to claim 1, further comprising a use period of time measuring part for accumulating a period of time during which the goods have been used, wherein the time condition for determining a performance value is that a total use period of time of the goods exceeds a predetermined period of time.

3. A performance value determination system according to claim 1, further comprising a use number of times measuring part for measuring a number of times the goods have been used, wherein the time condition for determining a performance value is that a total use number of times of the goods exceeds a predetermined number of times.

4. A performance value determination system according to claim 1, further comprising a performance data effectiveness determining part for determining whether or not the performance data is effective, wherein, in a case where it is judged that the time condition for determining a performance value is satisfied, effectiveness of the performance data stored in the performance data storing part is determined.

5. A performance value determination system according to claim 1, further comprising an input data storing part for storing input data inputted for exhibiting a function of the goods, wherein, in a case where it is judged that the time condition for determining a performance value is satisfied, the input data is passed to a provider of the goods.

6. A performance value determination system according to claim 5, wherein, in the input data storing part, only the input data in a case where a predetermined function of the goods cannot be exhibited is stored.

7. A method for determining a performance value with respect to goods having an index for objectively evaluating performance thereof, comprising:

inputting and storing a time condition for determining a performance value;

measuring performance of the goods during use as performance data;

storing the performance data;

judging whether or not the time condition for determining a performance value is satisfied; and in a case where it is judged that the time condition for determining a performance value is satisfied, determining a value of the goods based on the stored performance data by a time determined by the time condition.

8. A method for determining a performance value according to claim 7, further comprising determining whether or not the performance data is effective, wherein, in a case where it is determined that the time condition for determining a performance value is satisfied, effectiveness of the stored performance data is determined.

9. A method for determining a performance value according to claim 7, further comprising storing input data inputted for exhibiting a function of the goods, wherein, in a case where it is determined that the time condition for determining a performance value is satisfied, the input data is passed to a provider of the goods.

10. A computer-readable recording medium storing a program to be executed by a computer, for realizing a performance value determination method for determining a value in accordance with performance, with respect to goods having an index for objectively evaluating performance thereof, the program comprising:

inputting and storing a time condition for determining a performance value;

measuring performance of the goods during use as performance data;

storing the performance data;

judging whether or not the time condition for determining a performance value is satisfied; and in a case where it is judged that the time condition for determining a performance value is satisfied, determining a value of the goods based on the stored performance data by a time determined by the time condition.

* * * * *